US006545270B2

(12) United States Patent
Speakman et al.

(10) Patent No.: US 6,545,270 B2
(45) **Date of Patent: *Apr. 8, 2003**

(54) PLASMA MASS SPECTROMETER

(75) Inventors: James Speakman, Northwhich (GB); Raymond Clive Haines, Tarporley (GB); Patrick James Turner, Wilmslow (GB); Thomas Oliver Merren, Hale (GB); Stuart Alan Jarvis, Manchester (GB)

(73) Assignee: Micromass Limited, Manchester (GB)

( * ) Notice: Subject to any disclaimer, the term of this patent is extended or adjusted under 35 U.S.C. 154(b) by 78 days.

This patent is subject to a terminal disclaimer.

(21) Appl. No.: 09/805,062

(22) Filed: Mar. 14, 2001

(65) Prior Publication Data

US 2001/0010354 A1 Aug. 2, 2001

Related U.S. Application Data

(63) Continuation of application No. 08/866,524, filed on May 30, 1997, now Pat. No. 6,222,185.

(30) Foreign Application Priority Data

Jun. 10, 1996 (GB) ............................................ 9612070

(51) Int. Cl.[7] .......................... B01D 59/44; H01J 49/00
(52) U.S. Cl. ....................................... 250/288; 250/290
(58) Field of Search ................................ 250/281, 288, 250/292

(56) References Cited

U.S. PATENT DOCUMENTS

| | | | | |
|---|---|---|---|---|
| 4,234,791 A | | 11/1980 | Enke et al. | |
| 4,328,420 A | | 5/1982 | French | |
| 4,746,794 A | | 5/1988 | French et al. | |
| 4,963,735 A | | 10/1990 | Okamoto et al. | |
| 4,963,736 A | | 10/1990 | Douglas et al. | |
| 4,999,492 A | | 3/1991 | Nakagawa | |
| 5,248,875 A | | 9/1993 | Douglas et al. | |
| 5,426,301 A | | 6/1995 | Turner | |
| 5,481,107 A | | 1/1996 | Takada et al. | |
| 5,576,540 A | | 11/1996 | Jolliffe | |
| 5,672,868 A | * | 9/1997 | Mordehai et al. | 250/288 |
| 5,739,530 A | * | 4/1998 | Franzen et al. | 250/288 |
| 5,767,512 A | * | 6/1998 | Eiden et al. | 250/282 |
| 5,818,041 A | * | 10/1998 | Mordehai et al. | 250/288 |

FOREIGN PATENT DOCUMENTS

| | | |
|---|---|---|
| GB | 2263578 | 7/1993 |
| JP | 7201304 | 8/1995 |
| JP | 8036989 | 2/1996 |
| WO | WO 94/27311 | 11/1994 |
| WO | WO 95/23018 | 8/1995 |

OTHER PUBLICATIONS

Dawson, Douglas, Ch.6 in Tandem Mass Spectrom. Ed. McLarfferty, pub. Wiley 1983.

(List continued on next page.)

*Primary Examiner*—Bruce Anderson
(74) *Attorney, Agent, or Firm*—Diederiks & Whitelaw, PLC

(57) ABSTRACT

A plasma mass spectrometer comprises a plasma torch (1) for generating ions from a sample introduced into a plasma (2), a nozzle-skimmer interface (3,5) for transmitting said ions into a first evacuated chamber (11), ion guiding means (12), an apertured diaphragm (18) dividing said first evacuated chamber (11) from a second evacuated chamber, and an ion mass-to-charge ratio analyzer in the second chamber for producing a mass spectrum. The ion guiding means comprises a multipole rod-set (13,14,15), means for applying an AC voltage between rods in the set, and means (22) for introducing into said ion guiding means an inert gas selected from the group comprising helium, neon, argon, krypton, xenon and nitrogen so that the partial pressure of said inert gas inside said rod-set is at least $10^{-3}$ torr. Interfering peaks in the spectrum, such as $Ar^{+}$, are thereby reduced.

24 Claims, 6 Drawing Sheets

OTHER PUBLICATIONS

Douglas, Can. J. Spectros. 1989, vol. 34 (2) pp38–49.

King, Harrison, Int. J. Mass Spectrom and Ion Proc., 1989, vol. 89, pp171–185.

Rowan, Houk, Appld. Spectrsc. 1989 vol. 43 (6), pp976–980.

Rowan, Thesis, Iowa State Univ. 1989.

Douglas, French, J. Am. Soc. Mass Spectrom 1992, vol. 3, pp398–408.

Barinaga, Eiden, Koppenaal, paper MOF 930, abstracts, 43$^{rd}$ Conf. Am. Soc. Mass Spectrom 1995.

Eiden, Barinaga, Koppenaal, paper ThOC930, abstracts, 43$^{rd}$ Confr. Am. Soc. Mass Spectrom, 1995.

Thomson, Douglas, Carr et al. Anal. Chem. 1995, vol. 67, pp1696–1704.

Barinaga, Eiden, Koppenaal, paper WPC55, abstracts, 44$^{th}$ Confr. Am. Soc. Mass Spectrom., 1996.

Eiden, Barinaga, Koppenaal, paper WPC56, abstracts, 44$^{th}$ Confr. Am. Soc. Mass Spectrom., 1996.

Eiden, Barinaga, Koppenaal, J. Am. Soc. Mass Spectrom., 1996, vol. 7, pp1161–1171.

Eiden, Barinaga, Koppenaal, J. Anal. At. Spectrom., 1996, vol. 11, pp317–322.

* cited by examiner

PLASMA MASS SPECTROMETER

This application represents a continuation of U.S. patent application Ser. No. 08/866,524 filed May 30, 1997, U.S. Pat. No. 6,222,185.

This invention relates to a plasma (inductively-coupled or microwave induced) mass spectrometer, and in particular to such a spectrometer intended for the determination of isotopic ratios.

Two of the most significant problems which limit the performance of prior plasma mass spectrometers are firstly, the very low efficiency of transfer of the ions generated in the plasma through the interface into the vacuum system containing the mass analyzer, and secondly, the presence of interfering ion signals, sometimes very intense, due to species generated in the plasma other than the atomic ions characteristic of the elements present in a sample. These interfering ion species comprise atomic or molecular ions such as $Ar^+$, $Ar^{++}$, $ArH^+$, $ArN^+$ etc. which are generated by the plasma in the absence of any introduced sample, and also molecular ions such as oxides, argides and hydride ions formed by reaction of the elements present in a sample with other species present in the sample. Not only do some of these interfering ions mask the signals from atomic ions for which a measurement is required because they have the same mass-to-charge ratio as that of an atomic ion to be measured, but they also result in a very high total ion current, much greater than that typically available from a sample. The maximum ion current that can be transmitted through any ion-optical system is generally limited by space-charge effects, and in practice the high ion current due to these unwanted species can saturate the spectrometer optics, reducing the number of sample ions transmitted and causing other undesirable effects such as mass discrimination and matrix effects.

Considerable research effort has been expended in trying to reduce both the quantity and the deleterious effect of these interfering ions, and the following is a review of that work relevant to the present invention. Rowan and Houk (Appld. Spectroscopy, 1989 vol 43(6) pp 976–980) and Rowan (Thesis, Iowa State University, submitted 1989) describe a failed attempt to reduce the number of polyatomic ions entering the mass analyzer of a plasma mass spectrometer by collision-induced dissociation. An RF-only quadrupole was disposed between the nozzle-skimmer interface and the mass-analyzing quadrupole of an otherwise conventional ICP mass spectrometer, and a collision gas, (typically xenon) was introduced into it at a pressure between $10^{-5}$ and $10^{-4}$ torr. It was hoped that this would induce dissociation of unwanted polyatomic species before they entered the mass analyzer by a mechanism similar to the collisional dissociation of molecular ions used in the triple quadrupole mass spectrometers intended for use in organic mass spectrometry. Although Rowan and Houk were able to demonstrate an improvement in the ratio of wanted to unwanted ions by this technique, the ion transmission efficiency of the instrument was greatly reduced and the intensity of the background signals increased, so that they concluded that any beneficial effect was in general outweighed by the disadvantages.

A similar approach was reported by Douglas (Can. J. Spectroscopy, 1989 vol 34(2) pp 38–49, in particular the passage bridging pp 47–48). In this work a triple quadrupole spectrometer was fitted with an ICP source with the aim of dissociating unwanted polyatomic ions in the centre quadrupole. This approach also failed, and Douglas predicted that it would not be possible to achieve large gains in the atomic ion to polyatomic ion ratio by collision-induced dissociation because the loss cross-sections for the atomic ions were found to be much higher than expected; so much higher, in fact, that they were comparable to those of the polyatomic ions. Thus the net effect of the collision process would be to cause roughly equal losses of both atomic and polyatomic ions. Douglas concludes that a more profitable approach might be to use ion-molecule chemistry in the centre quadrupole (that is, to chemically convert both wanted and unwanted ions, for example by reaction with oxygen) to species such as oxides. Certain polyatomic species generated in the plasma, for example oxides, would then be less likely to undergo further reaction, so that the ratio of reacted atomic ions to reacted polyatomic ions would in some cases be reduced. However, this approach is obviously highly specific and while reducing the effect of one interfering ion may introduce another that was not previously present.

Also in 1989, King and Harrison (Int. J. Mass Spectrom. And Ion Proc, 1989 vol. 89 pp 171–185) described the use of collision-induced dissociation to remove polyatomic ion interferences in glow-discharge mass spectrometry. Like Douglas, they employed a triple quadrupole mass spectrometer and used the centre quadrupole as a collision cell. Their results were similar to those of Rowan and Houk with an ICP spectrometer, namely, that although it was possible to demonstrate a reduction in the ratio of certain polyatomic ions to wanted atomic ions, the ion transmission was severely reduced, causing an overall reduction in detection limits.

Presumably because of the failure of the work in 1989 to demonstrate a worthwhile reduction in polyatomic ion interferences in ICPMS, and Douglas's comments that this was to be expected on theoretical grounds, research effort related to reducing interferences switched to development of other aspects of ICPMS, and it was not until 1996 that Eiden, Barinaga and Koppenaal (J. Anal. Atomic. Spectrom., 1996 vol 11 pp 317–322) described a method for the selective removal of plasma matrix ions such as $Ar^+$ from either an ion-trap ICP spectrometer or from the ion beam in a quadrupole ICP mass spectrometer by the reaction of added gaseous hydrogen with the ions sampled from the plasma. In practice, hydrogen was introduced into the vacuum system of the spectrometer downstream of the conventional nozzle-skimmer system (which is used to interface the plasma to the mass analyzer) at a pressure of about 10 mtorr, and it was found that $Ar^+$ ions were removed 45 times faster than typical atomic ions, leading to a large reduction in the intensity of the $Ar^+$ peak in a typical mass spectrum. The results were more spectacular in the case of an ion-trap spectrometer, leading to almost complete elimination of the $Ar^+$ peak. Eiden et.al. also suggest that the efficiency of the removal of $Ar^+$ in a quadrupole mass spectrometer might be increased by using a radio-frequency quadrupole ion guide (or other multipole device), into which hydrogen is introduced, between the skimmer and the mass analyzer. They suggest that operating the quadrupole guide with a low-mass cut-off of between 5 and 15 daltons might reject charged hydrogen ions generated by chemical reaction between the added hydrogen and the unwanted $Ar^+$ ions, thereby minimising the number of charged species passing into the mass analyzer and consequently reducing space-charge related problems. However, the method is dependent on chemical reaction between the added hydrogen and the unwanted ions, and similar reactions may take place between the hydrogen and the atomic ions to be determined, albeit at a much slower rate, generating unwanted mass discrimination effects and additional molecular ions. Because the removal of ions is a chemical process, Eiden, et al, do not teach that any gas other than hydrogen could be used.

Further art relevant to this invention is typified by U.S. Pat. No. 4,963,736 which teaches an atmospheric pressure ionization (API) quadrupole mass spectrometer in which an AC-only multipole (i.e., quadrupole or hexapole, etc) rod set is disposed between the API source and the quadrupole mass filter. Gas is introduced into the vacuum system in the vicinity of the additional rod set. The inventors claim that this results in improved mass resolution of the quadrupole mass analyzer and a narrow range of energies of the ions emerging from the additional rod set. More details of this technique were later published by the inventors (Douglas and French) in J.Am. Soc. Mass Spectrom., 1992, vol 3 pp 398–408. However, neither the patent or the subsequent paper teach or even suggest that the collisional focusing which it describes could advantageously be employed in the case of a plasma mass spectrometer having an ICP or MIP source.

Other prior art relating to the field of the present invention includes WO 95/23018 which teaches a variety of multipolar ion guides for transporting ions through one or more pressure reduction stages between the ion source and the mass analyzer of a mass spectrometer. These rod sets extend from a first region maintained at a first pressure into a second region maintained at a second pressure. The multipolar rod sets may comprise 4,6, or 8 electrodes and the pressure in the space inside them may be in the range taught by U.S. Pat. No. 4,963,736, at least along part of their length. WO 95/23018 also suggests that its multipolar rod sets may be used in conjunction with an ICP source, but does not teach the use of a rod set whose entrance and exit are disposed in the same region and maintained at substantially the same pressure.

In the following, the term "plasma mass spectrometer" is used to describe mass spectrometers having either microwave-induced (MIP) or inductively-coupled (ICP) plasma ion sources operating substantially at atmospheric pressure, and the word "plasma" means either an ICP, MIP, or glow discharge.

It is an object of the invention to provide a plasma mass spectrometer in which the interference from $Ar^+$ and other ions generated in the plasma itself in the absence of any introduced sample is greatly reduced. It is another object to provide plasma mass spectrometers having greater mass resolution and higher ion-transmission efficiency than prior types with comparable mass analyzers. It is a further object to provide a magnetic sector plasma mass spectrometer for the determination of isotopic ratios which is less expensive and simpler than prior types of double-focusing plasma mass spectrometers.

In accordance with these objectives there is provided a mass spectrometer comprising:

1) means for generating ions from a sample introduced into a plasma;
2) nozzle-skimmer interface means for transmitting at least some of said ions from said plasma into a first evacuated chamber along a first axis;
3) diaphragm means comprising an aperture, said diaphragm means dividing said first evacuated chamber from a second evacuated chamber;
4) ion guiding means disposed in said first evacuated chamber for guiding ions from said nozzle-skimmer interface means to said aperture; and
5) ion mass-to-charge ratio analyzing means having an entrance axis and disposed to receive ions passing through said aperture and to produce a mass spectrum thereof;

said mass spectrometer being characterised in that said ion guiding means comprises:

1) one or more multipole rod-sets, the or each set comprising a plurality of elongate electrode rods spaced laterally apart a short distance from each other about a second axis to define an elongate space therebetween extending longitudinally through such set;
2) means for applying an AC voltage between rods comprised in the or each set such that ions entering said set travel in said elongate space through said rod set; and
3) means for introducing into said ion guiding means an inert gas selected from the group comprising helium, neon, argon, krypton, xenon and nitrogen so that the partial pressure of said inert gas in at least a portion of said elongate space inside said rod set(s) is at least $10^{-3}$ torr.

Preferably, helium is introduced into said ion guiding means.

Further preferably, at least a portion of said ion guiding means is surrounded by gas containment means disposed wholly within said first evacuated chamber and disposed so that both the entrance and exit of the ion guiding means are outside of it. Said inert gas may then be introduced into said containment means. In this way a partial pressure of at least $10^{-3}$ torr can be maintained in at least a portion of the ion guiding means while its entrance and exit are maintained at a lower pressure (typically that of the first evacuated chamber). Preferably the gas containment means is shorter than the ion guiding means and is disposed so that its longitudinal centre is closer to the entrance of the guiding means than to the exit. Typically, the length of the gas containment means may be 50% or less of the length of the ion guiding means. The inert gas should be introduced into the gas containment means so that the highest partial pressure of inert gas in the ion guiding means is located between its entrance and a point half-way along its length. A point about one-third of the length from the entrance is most preferred. The best results are obtained when the gas containment means is disposed with one end just downstream of the entrance of the ion guiding means.

Further preferably, the gas containment means should be such that a partial pressure of at least $10^{-3}$ torr of inert gas can be maintained within it while the pressure in the first evacuated chamber is maintained at less than $10^{-4}$ torr. The inventors have found that it is particularly advantageous to maintain the pressure at the exit of the guiding means as low as possible, and this is facilitated by use of a gas containment means which is shorter than the guiding means and is located towards the entrance, rather than the exit, of the guiding means.

The ion guiding means preferably comprises a hexapole rod set, but quadrupole or octupole sets may be used instead. It has been found that a hexapole set results in only a minimal variation in ion transmission efficiency with mass-to-charge ratio, which is especially important if isotopic ratios are to be determined. Conveniently, the length of the rod set is between 20 and 100 times greater than the radius of the elongate space between the rods, and most preferably about 50 times. The elongate rods may conveniently be of constant diameter and be disposed parallel to one another, but the use of electrode rods which are tapered and/or not parallel to each other is also within the scope of the invention. Further, an axial potential gradient may be provided along the ion guiding means which can assist ion transmission. This can be done, for example, by providing an ion guiding means which comprises a plurality of multipole rod sets disposed one after the other, with each portion having a different axial potential, or by splitting the gas containment means which surrounds the ion guiding means into several segments insulated from one another and applying different DC potentials to the segments, but other methods are also possible.

Although the rods comprising the ion guiding means are preferably supplied only with an AC voltage, it is also within the scope of the invention to add a DC potential in the manner conventional for quadrupole mass analysers, particularly if a quadrupole arrangement is employed.

In a further preferred embodiment the first axis (of the nozzle-skimmer interface means) does not pass through and the aperture in the diaphragm, so that there exists no line-of-sight path along the first axis to the aperture. The ion-guiding means is disposed so that the second axis is inclined to the first axis so that ions leaving the nozzle-skimmer interface means enter the elongate space in the guiding means and are guided by the ion confining action of the guiding means to the aperture. In this way neutral molecules or atoms are prevented from passing into the aperture and into the ion mass-to-charge analyzing means and background signals can be minimised.

In addition, a further reduction in background can be obtained by arranging the entrance axis of the mass analyzer (which receives the ions from the ion guiding means which have passed through the aperture in the diaphragm means) to be inclined relative to the second axis (of the ion guiding means). Conveniently, by inclining the second axis to both the first axis and the entrance axis, the first and entrance axes can be arranged parallel to one another, which facilitates the construction of an instrument.

In further preferred embodiments the ion mass-to-charge analyzing means comprises a magnetic sector mass analyzer. For the purposes of isotopic ratio measurements, the analyzer may be fitted with a plurality of ion collectors disposed along its image focal plane so that ions of several different mass-to-charge ratios can be measured simultaneously. Such multi-collector systems are conventional in magnetic sector isotope ratio mass spectrometers. Surprisingly, the inventors have found that it is unnecessary to use a double-focussing mass analyzer (i.e., one incorporating an electrostatic ion-energy analyzer) for this purpose because the mass resolution and abundance sensitivity of a spectrometer according to the invention is very much greater than that of a prior single-focusing plasma spectrometer with a comparable magnetic sector analyzer, but if very high resolution is required, a double-focusing analyzer could be used.

In alternative preferred embodiments, the ion mass-to-charge ratio analyzer may comprise a quadrupole mass analyzer. Such an embodiment provides an ICP mass spectrometer which is capable of analyzing atomic species which yield ions at mass-to-charge ratios where significant interferences occur with prior quadrupole instruments without the expense of a high resolution mass analyzer. In yet another preferred embodiment, the ion mass-to-charge ratio analyzer may comprise a time-of-flight analyzer, particularly one having an orthogonal disposition of the entrance axis and the ion drift direction. Such an instrument typically exhibits greater sensitivity than a quadrupole based instrument.

It is also within the scope of the invention to employ a quadrupole ion-trap or an ion cyclotron resonance mass analyzer as the ion mass-to-charge-ratio analyzer.

The inventors have surprisingly found that in a spectrometer according to the invention, ions such as $Ar^+$ and $ArX^+$ (where X=H, C, O, N, Cl, or Ar, etc) are very greatly reduced in intensity. This is in contrast with the work of Eiden et al. who observed suppression only as a consequence of the use of hydrogen alone and in the absence of a guiding means, and ascribed the suppression to the removal of argon ions by chemical reaction with hydrogen. Such a mechanism is clearly not possible when an inert gas is used.

It has also been found that in a spectrometer according to the invention, the mass resolution and abundance sensitivity of the ion mass-to-charge ratio analyzer is greatly improved in comparison with prior spectrometers. In contrast with the arrangement taught in U.S. Pat. No. 4,963,736 for an API source, the improvements are most marked when the second axis (of the ion-guiding means) is inclined to both the first axis (of the nozzle-skimmer interface) and entrance axis of the mass analyzer, so that no line-of-sight path exists along the nozzle-skimmer axis to the entrance aperture of the analyzer Viewed from another aspect the invention provides a method of mass spectrometric analysis of a sample comprising the following steps carried out sequentially:

1) introducing a said sample into a plasma to generate ions therefrom;
2) passing at least some of said ions through nozzle skimmer interface means into a first evacuated chamber;
3) guiding at least some of the ions entering said first evacuated chamber to an aperture in a diaphragm which divides said first evacuated chamber from a second evacuated chamber; and
4) mass analyzing at least some of the ions passing into said second evacuated chamber to produce a mass spectrum thereof;

said method being characterised in that:

1) the step of guiding said ions comprises passing said ions through ion guiding means comprising one or more multipole electrode rod sets which comprise a plurality of elongate rod electrodes spaced laterally apart a short distance from each other to define an elongate space therebetween which extends longitudinally through the set, and applying an AC voltage to said rod electrodes; and
2) introducing into said guiding means an inert gas selected from the group comprising helium, neon, argon, krypton, xenon and nitrogen so that the partial pressure of said inert gas in at least a portion of said elongate space is at least $10^{-3}$ torr.

In the case of a quadrupole or quadrupole ion-trap mass analyser, further advantage is obtained by maintaining only a very low potential difference between the potential of the second axis and the potential of the central axis of a subsequent quadrupole mass analyzer or the potential of the centre of a subsequent ion trap. With the gas in the ion guiding means at room temperature, this potential difference should be approximately 1 volt (with the axial potential of the ion guiding means more negative than the mass analyzer, for the case of positive ions). The potential difference is very critical and may be adjusted for maximum ion transmission. If it is too high, no ions will have sufficient energy to cross the potential barrier and enter the mass analyzer. The inventors have also discovered that adjustment of this potential provides a means of further reducing the interferences due to molecular ions generated in the plasma. It has been observed that as the potential is increased from slightly above zero towards the cut-off potential mentioned above, the intensity of the molecular ions such as argides and oxides is reduced significantly before the intensity of the atomic ions is affected.

This is unexpected because following the teachings of U.S. Pat. No. 4,963,736 it would be expected that the energy of the ions passing through the ion guiding means would in all cases become that of the thermal energy of the gas in the ion-guiding means. It appears, however, that the energy acquired by the molecular ions passing through the guiding means is slightly lower than that acquired by the atomic ions, so that adjusting the potential through which the ions must travel can effectively prevent molecular ions reaching the mass analyzer. The invention therefore further provides a method as previously defined wherein the step of mass analyzing said ions comprises the use of a quadrupole mass analyser having a central axis and the step of guiding said ions comprises passing ions through ion guiding means having a central axis, said method further comprising the step of maintaining a potential difference between the potential of the central axis of said ion guiding means and the potential of the central axis of said quadrupole mass analyser such that the transmission of polyatomic ions is reduced relative to that of atomic ions. Alternatively, the invention provides a method as previously defined wherein the step of mass analyzing said ions comprises the use of a quadrupole ion-trap mass analyser having a centre and the step of guiding said ions comprises passing ions through ion guiding means having a central axis, said method further comprising the step of maintaining a potential difference between the potential of the central axis of said ion guiding means and the potential at the centre of said quadrupole ion-trap mass analyser such that the transmission of polyatomic ions is reduced relative to that of atomic ions. In this way the invention provides a method of reducing molecular ion interferences in plasma mass spectroscopy carried out in a spectrometer as defined above. Typically this potential difference is in the range 0±1 volt and is critical to a few tenths of a volt.

It will be appreciated that in the case of a magnetic sector mass analyzer it is necessary to accelerate the ions before they enter the magnetic sector to a high kinetic energy. Conventionally this is done by maintaining the ion source at a high positive potential and grounding the entrance aperture of the analyzer and all the subsequent components. However, in a spectrometer according to the invention, it is preferred to maintain the nozzle-skimmer interface and ion-guiding means at approximately ground potential. This necessitates maintaining the entrance aperture, flight-tube and detector system of the spectrometer at a high negative potential so that the ions acquire the necessary kinetic energy for dispersion by the magnetic sector as they pass through the entrance aperture. It is within the scope of the invention, however, to maintain the nozzle-skimmer interface and ion-guiding means at a high positive potential and to maintain the flight tube and detector system at ground potential.

In a still further preferred embodiment, electrostatic lens means are provided between the nozzle-skimmer interface and the entrance of the ion-guiding means. Typically this lens means is maintained at a potential of between 600 and 1000 volts negative (in the case of positive ions) relative to the potential of the nozzle-skimmer interface and the ion guiding means. Preferably the electrode comprises a hollow conical structure disposed with its apex closest to the skimmer. The lens electrode may also serve as a second diaphragm to define an additional evacuated chamber and therefore provide an additional stage of differential pumping between the nozzle-skimmer interface and the ion-guiding means. The potential applied to the electrostatic lens means is adjusted to improve the transmission efficiency of ions from the nozzle-skimmer interface to the ion guiding means. The inventors have found that when the potential is correctly set, the lens means increases the transmission efficiency by more than a factor of 100, particularly of the ions of low mass-to-charge ratio which in its absence are most likely to be lost because of space-charge effects in the vicinity of the skimmer. It has also been found that the provision of the lens reduces the transmission of ions such as $ArO^+$, consequently improving the detection sensitivity for Fe. Use of this lens also greatly reduces mass discrimination in the nozzle-skimmer interface region, which is especially valuable when isotopic ratios are to be determined.

As in most prior plasma spectrometers, samples to be analyzed may be introduced into the plasma in the form of an aerosol generated by a conventional nebulizer. The inventors have found that best results are obtained when samples are in the form of aqueous solutions.

It has also been found that the addition of small amounts (less than 5%, and most preferably less than 1%) of another material to the inert gas can further enhance performance. For example, the addition of 0.5% of xenon to a helium inert gas surprisingly has been found to further reduce the intensity of oxygenated molecular ions, and approximately 0.5% of hydrogen or water can result in a further reduction of ions such as $Ar^+$.

Preferred embodiments of the invention will now be described by way of example and by reference to the figures, in which.

Figure 1:
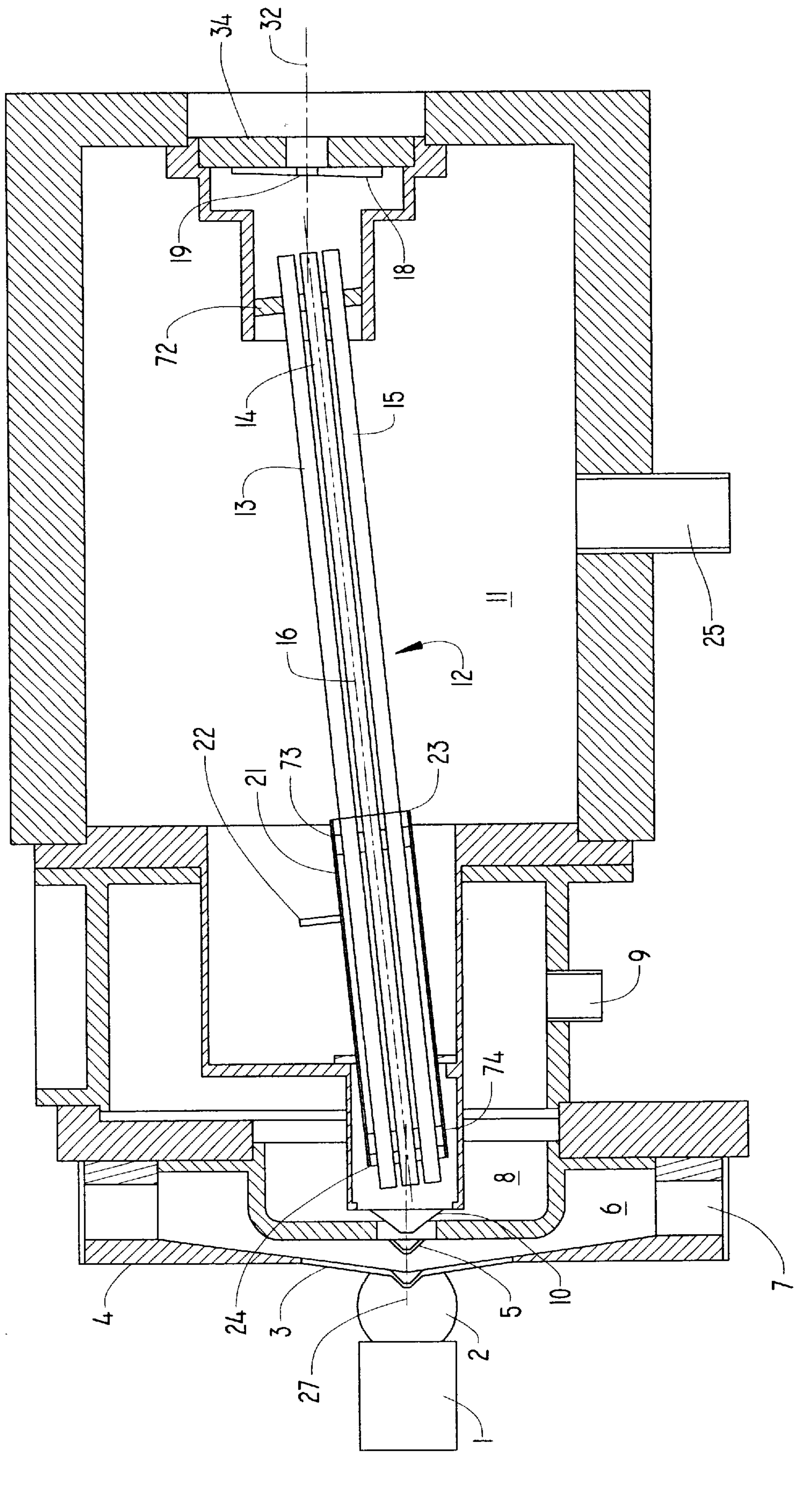
FIG. 1 is a sectional view of the interface and ion-guiding regions of a spectrometer according to the invention.

Referring first to FIG. 1, a spectrometer according to the invention comprises a plasma torch 1 which generates a plasma 2. Energy for generating the plasma is inductively coupled from RF current flowing in a coil (not shown) surrounding the torch 1, as in a conventional ICP mass spectrometer. The torch is disposed so that the plasma 2 is directed towards and is adjacent to a sampling cone 3 which is mounted on a water-cooled housing 4. A skimmer 5 is disposed downstream of the sampling cone 3 and the region 6 between the cone 3 and the skimmer 5 is evacuated by a mechanical vacuum pump (not shown) connected to the port 7 so that the pressure in the region 6 can be maintained at about 2 torr. The cone 3 and skimmer 5 comprise a nozzle-skimmer interface through axially aligned apertures in which ions may pass from the plasma 2 into an evacuated region 8 in which the pressure is maintained at approximately $10^{-2}$ torr by means of a turbomolecular pump (not shown) connected to the port 9. Ions passing through the aperture in skimmer 5 then pass through an aperture in an electrostatic lens element 10 of hollow conical form which also serves to divide the evacuated region 8 from a first evacuated chamber 11 in which the pressure is maintained at about $10^{-3}$ torr by another turbomolecular pump (not shown) connected to the port 25.

Ion guiding means generally indicated by 12 are disposed in the first evacuated chamber 11 and comprise a multipole rod set of 6 elongate parallel electrode rods (3 of which are identified at 13, 14, and 15) disposed symmetrically around a second axis 16 to form a hexapole structure. The electrode rods are secured in position by three circular support insulators 72, 73, and 74, two of which (72 and 74) also locate the ion guiding means in the housing of the first evacuated chamber 11, as shown. An elongate space 17 (FIG. 2) extends longitudinally through the rods about the axis 16. An RF power supply 26 (FIG. 2) provides an AC voltage between the rods which are connected as shown. The second axis 16 of the rod set is inclined to the first axis 27 of the nozzle-skimmer interface (which passes through the apertures in the sampling cone 3 and the skimmer 5) as shown in FIG. 1. A diaphragm means comprising a tapered electrode 18 having an aperture 19 is provided to divide the evacuated chamber 11 from a second evacuated chamber 20, and the end of the ion guiding means 12 is disposed so that ions travelling through it exit through the aperture 19. Because of the inclination of the axis 16, the aperture 19 is of course displaced from the axis of the nozzle-skimmer interface.

Figure 3:
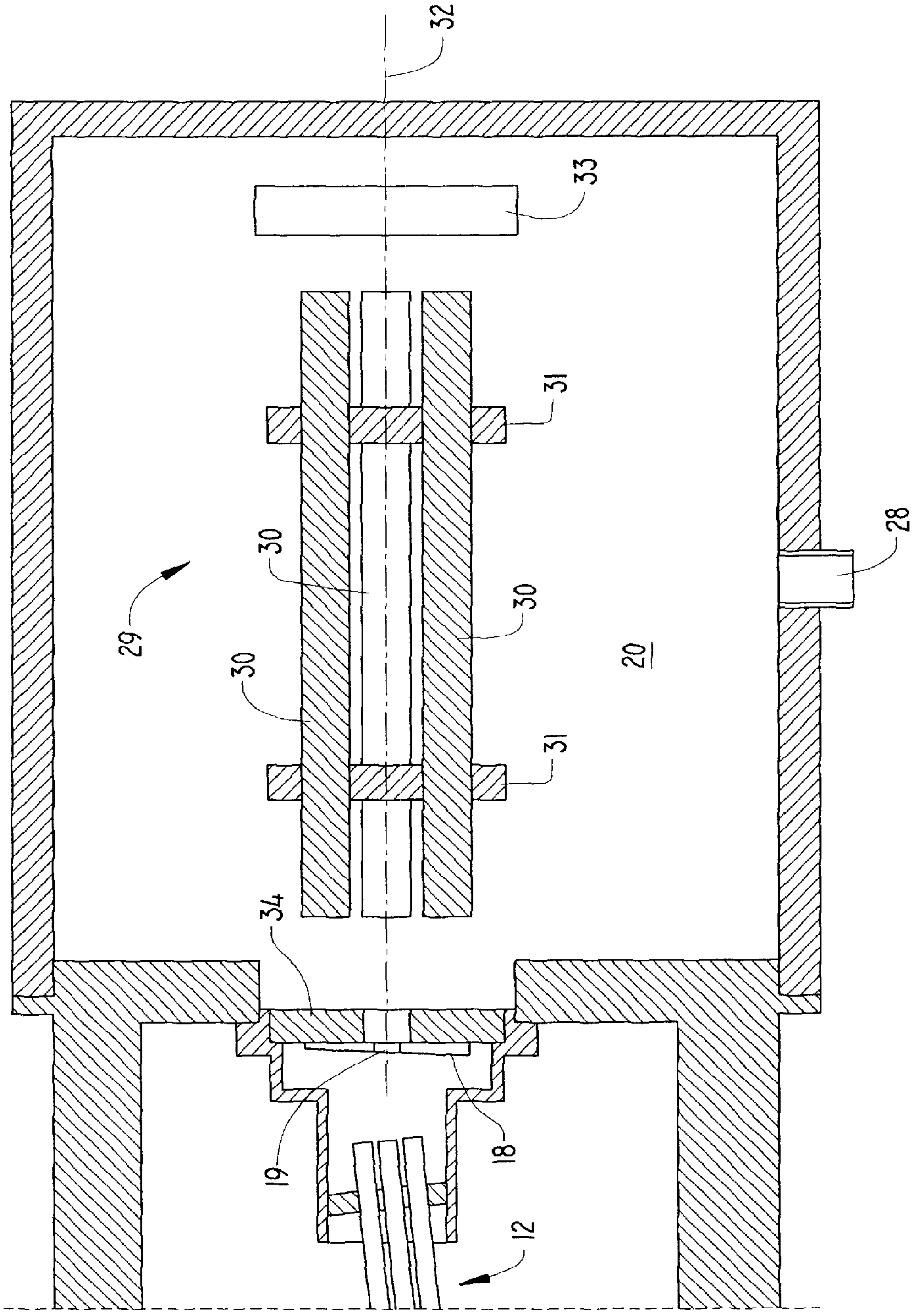
FIG. 3 is a sectional view of the mass analyser and detection regions of a spectrometer according to the invention having a quadrupole mass analyser.

Referring next to FIG. 3, a conventional quadrupole mass analyzer comprising a quadrupole mass filter and ion detector shown schematically at 29 and 33 respectively is disposed in the second evacuated chamber 20. The filter 29 comprises four electrodes 30 which are supported in insulators 31 in a conventional manner. The entrance axis 32 of the mass filter 29 is inclined to the second axis 16 of the ion guiding means 12, as shown in the figure, in order to further reduce the transmission of neutral particles from the plasma 2 into the filter 29. Ions leaving the exit of the ion guiding means 12 are deflected in a field generated by a suitable potential applied to the tapered electrode 18 (which is mounted on an insulated flange 34), so that they pass along the entrance axis 32 of the filter 29.

Figure 2:
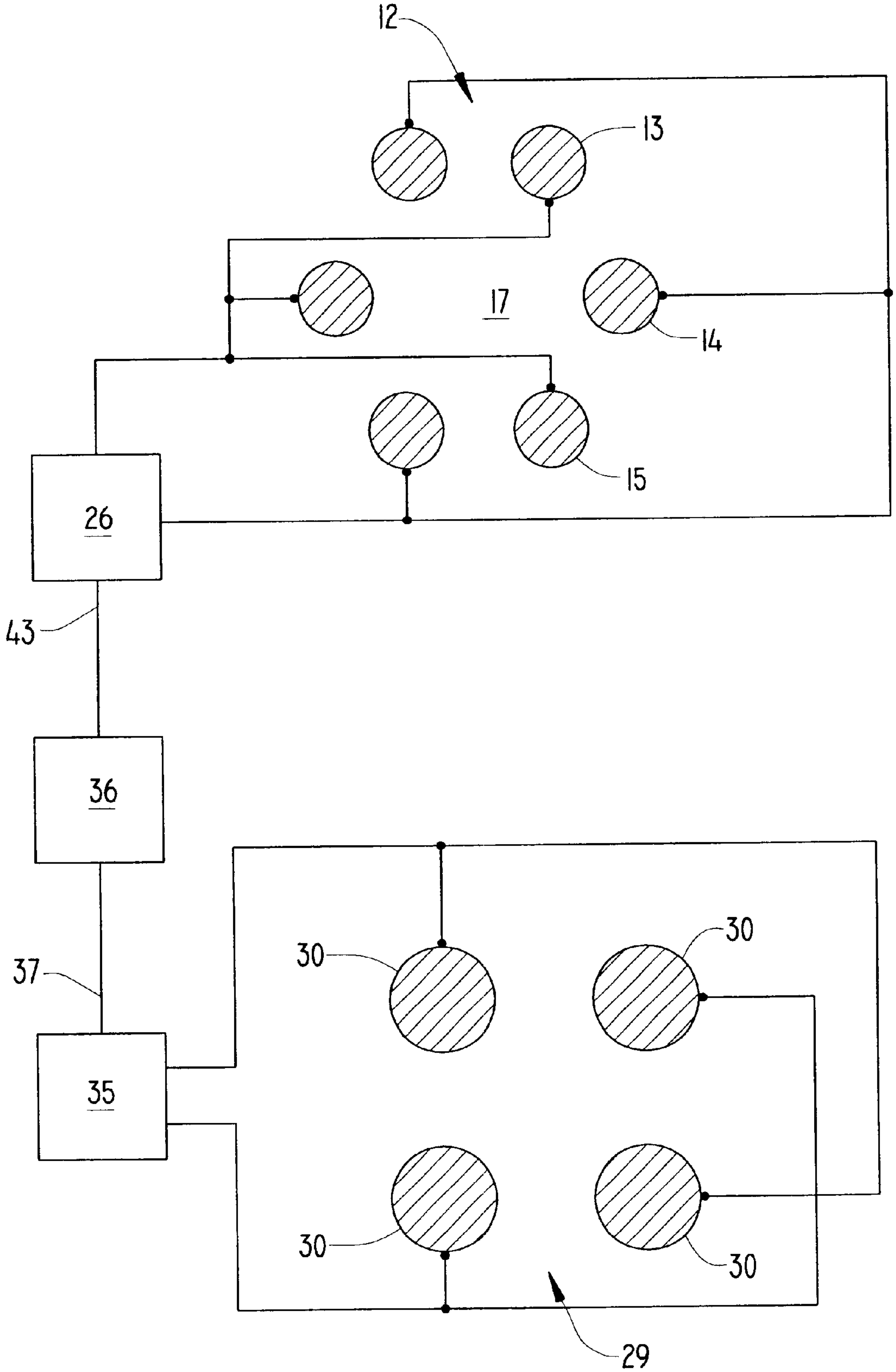
FIG. 2 is a drawing showing the electrical connections to the electrodes of an ion guiding means and a quadrupole mass analyser in a spectrometer according to the invention.

A conventional quadrupole mass filter power supply 35 is connected to the four electrodes 30 as shown in FIG. 2 to enable mass filtering of the ions entering along the axis 32. The power supply 35 has a bias input 37, the potential on which determines the potential of the central axis of the array of rods 30. Input 37 is connected to an adjustable voltage source 36 (see below). An AC-only power supply 26 feeds the electrodes comprising the ion guiding means 12, as shown in FIG. 2. Power supply 26 has a bias input 43, the potential on which controls the potential of the axis of ion guiding means, connected to the adjustable voltage source 36. Source 36 maintains a potential difference between the axial potentials of the ion guiding means and the mass filter, which potential difference is adjusted as described previously to increase the ratio of wanted atomic to unwanted polyatomic ions entering the mass filter. The potential difference is typically in the range 0±1 volts, dependent on the polarity of the ions, and must be carefully set and maintained at the selected value throughout the analysis, as previously explained.

Figure 4:
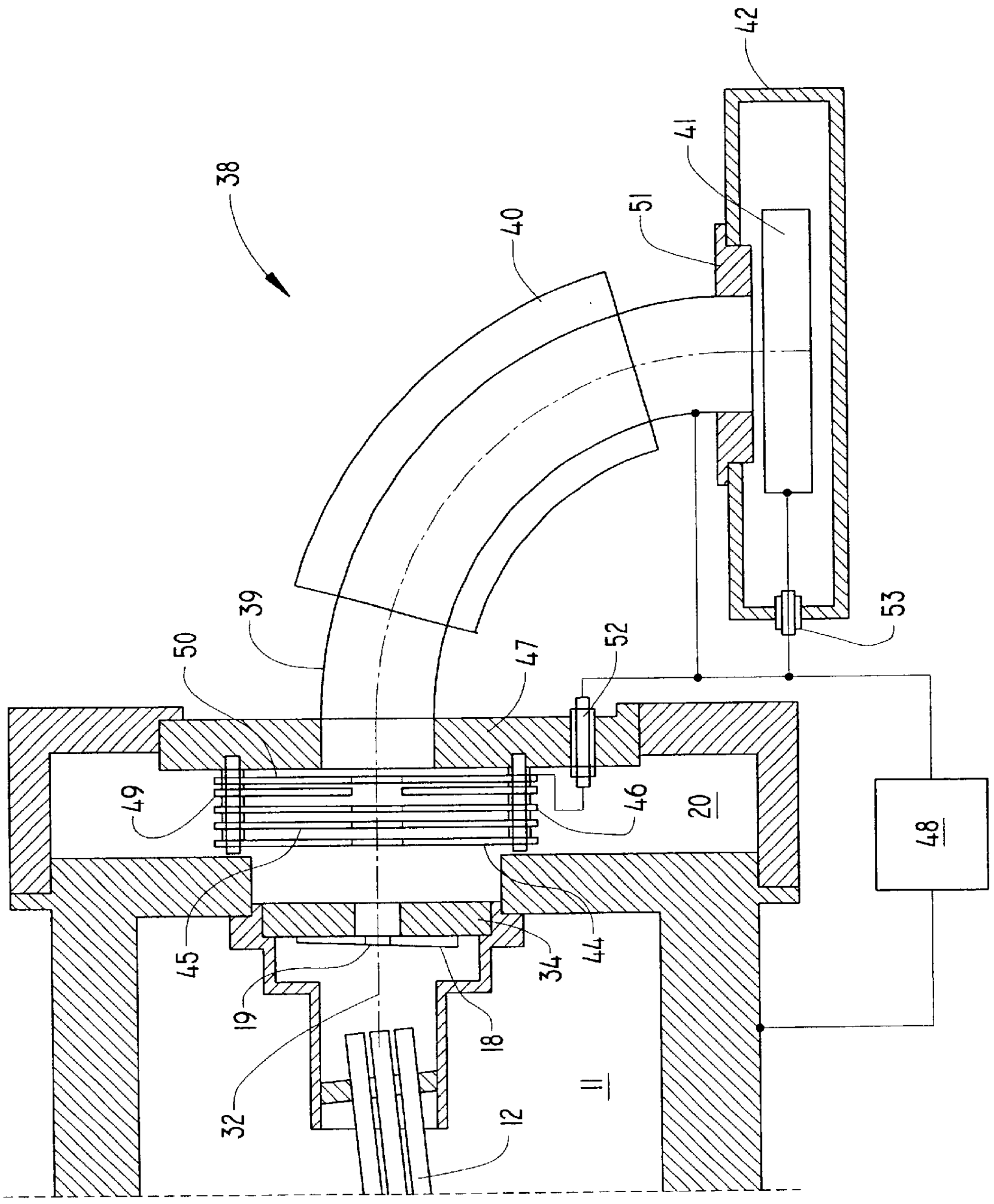
FIG. 4 is a sectional view of the mass analyser and detection regions of a spectrometer according to the invention having a magnetic sector mass analyser.

An alternative embodiment of the invention comprising a magnetic sector analyzer (generally indicated by 38) in place of a quadrupole mass analyzer is shown in FIG. 4. As for the case of the quadrupole analyzer, the magnetic sector analyzer is shown in simplified form as it is essentially of conventional known design. In this embodiment, ions passing through the aperture 19 in the tapered electrode 18 are deflected along the entrance axis 32 by the field resulting from a potential difference maintained between the electrode 18 and the central axis of the ion guiding means 12. This potential difference is typically between 1 and 5 volts positive (for positive ions), but is not as critical as the corresponding potential in the previous embodiment. Ions travelling along the axis 32 are then accelerated to the ion energy necessary for analysis in the magnetic field by an electrostatic lens stack comprising 5 electrodes 44, 45, 46, 49 and 50 which are maintained at increasingly negative potentials (in the case of positive ions). Electrode 50 is the entrance aperture of the magnetic sector analyzer 38 and is maintained at the accelerating potential of the analyzer (−6 KV), relative to the grounded housing of the second evacuated chamber 20 by an accelerating voltage supply 48. The other electrodes are supplied by adjustable potential dividers connected between the electrode 50 and the grounded housing. Typical potentials on electrodes 44, 45, 46, and 49 are −600 volts, −1500 volts, −3000 volts and −4000 volts respectively. Electrodes 45 and 49 comprise two "half" electrodes between which a small adjustable potential difference can be applied to steer the ion beam in the "y" and "z" directions, respectively.

Ions leaving the electrode 50 enter the flight tube 39 of the analyzer 38 with 6 KeV energy and are dispersed according to their mass-to-charge rations by a magnetic field generated between the poles 40 of an electromagnet. Because the ions enter the magnetic field at a potential of −6 KV, the flight tube 39 is mounted on insulating flanges 47 and 51 and is maintained at the potential of electrode 50. The ion detector system 41 is also maintained at the potential of electrode 50. The high voltage supply leads to electrode 50 and the detector 41 pass through high-voltage feedthroughs 52 and 53 in the wall of the chamber 20 and the detector housing 42, as shown. Although this arrangement is less convenient than the more conventional arrangement of a magnetic sector analyzer where the flight tube and detector system are at ground potential, it does allow the ion-guiding means 12 to operate with ions of low kinetic energy (which is essential for its proper operation) without being floated at high potential. However, the use of a grounded flight tube and detector and high potential ion guiding means is within the scope of the invention.

The inventors have found that with the FIG. 4 apparatus a considerable improvement in mass resolution and abundance sensitivity is achieved in comparison with a similar ICP spectrometer in which the ion guiding means 12 is omitted. The apparatus of FIG. 4 is therefore well-suited to the determination of isotopic ratios, particularly when the ion detector system 41 is of the multi-collector type allowing the simultaneous detection of the isotopes to be monitored. Good isotopic ratio accuracy may then be achieved without the additional complication of a double-focussing mass analyzer, although the use of such an analyzer in place of the magnetic sector analyzer alone shown in FIG. 4 is within the scope of the invention.

Figure 5:
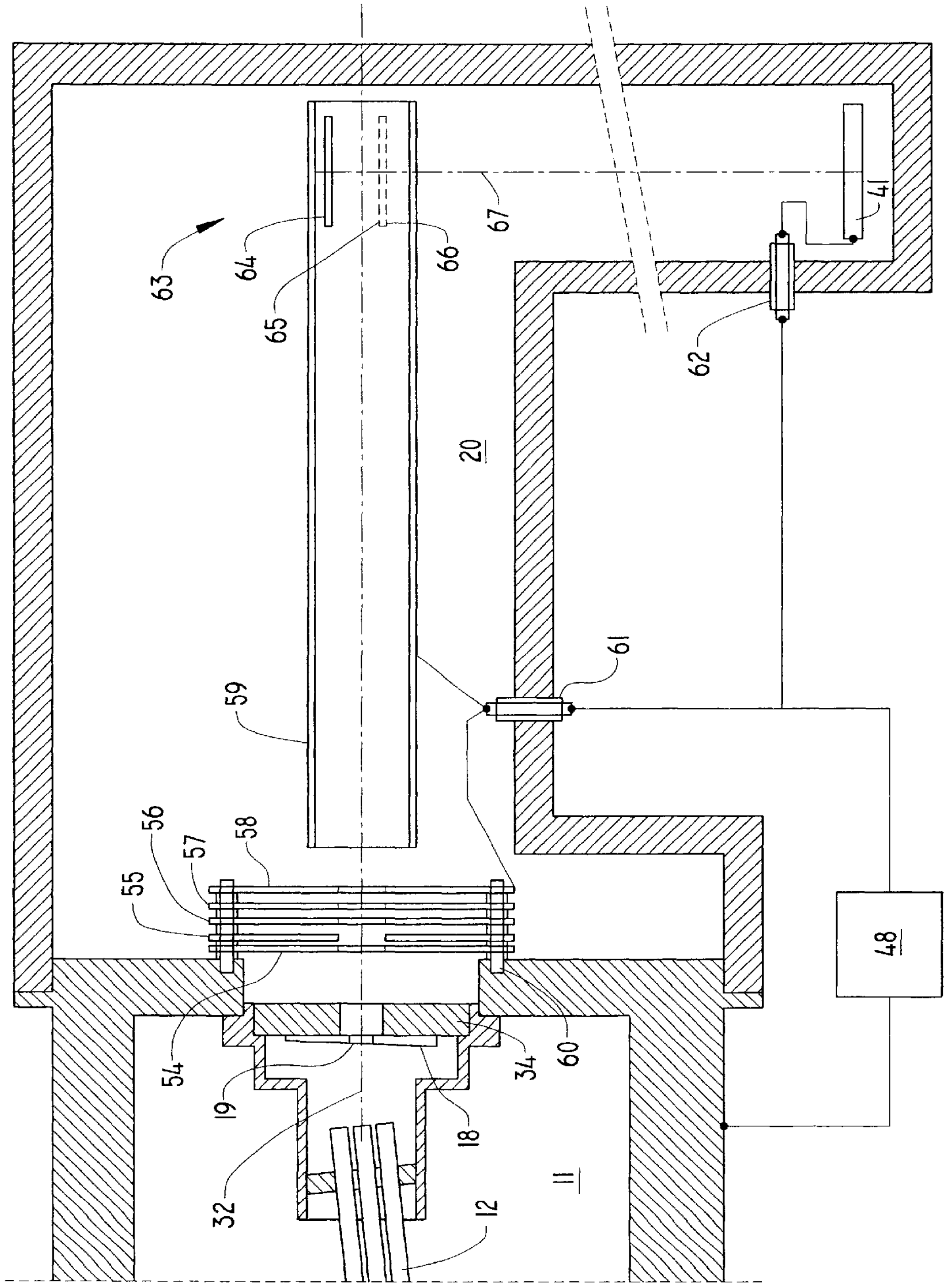
FIG. 5 is a sectional view of the mass analyser and detection regions of a spectrometer according to the invention having a time-of-flight mass analyser.

FIG. 5 illustrates how a time-of-flight (TOF) mass analyzer may be used in the invention. As in the previous embodiment, the TOF analyzer generally indicated by 63 is shown only in outline form. In this embodiment, ions pass through the aperture 19 in the tapered electrode 18 to travel along the entrance axis 32, exactly as described in the FIG. 4 embodiment.

They are then accelerated, deflected and focussed by the 5 electrodes 54–58 which are supported on the insulator assemblies 60. These electrodes are similar in function to the electrodes 44, 45, 46, 49 and 50 in the FIG. 4 embodiment, and the final electrode 58 is maintained at typically −2.5 KV (for positive ions) by the power supply 48 (connected to it via the feedthrough 61) relative to the grounded housing of the chamber 20. Ions therefore enter the electrostatic screening tube 59 (maintained at the same potential as electrode 58) with 2.5 KeV energy to the pulse-out region of the TOF analyzer 63. Conveniently the TOF analyzer is a conventional orthogonal type in which bunches of ions travelling along the axis 32 are orthogonally ejected along the drift axis 67 towards the ion detector system 41 by application of suitable electrical pulses to the electrodes 64,65 and 66. Ion detector system 41 is of course also maintained at the potential of electrode 58 via a connection to the feedthrough 62. An electrostatic screening tube similar to the tube 59 (not shown) may also be provided to screen the ions travelling along the drift axis 67 from the grounded vacuum enclosure of the drift region of the TOF analyzer. The operation of such a TOF spectrometer is known in the art and need not be described further. The inventors have found, however, that surprisingly high mass resolution is obtainable with apparatus according to FIG. 5, indicating that the spread in kinetic energies of the ions entering the pulse-out region of the analyzer is low. Consequently, good performance can be obtained using a simpler axial type of TOF analyzer in place of the orthogonal type shown in FIG. 5. It will be appreciated that the use of TOF analyzers can result in greater ion transmission efficiency and effectively simultaneous detection of several isotopic species, and is therefore especially useful in an ICP spectrometer according to the invention for the determination of isotopic ratios.

Figure 6:
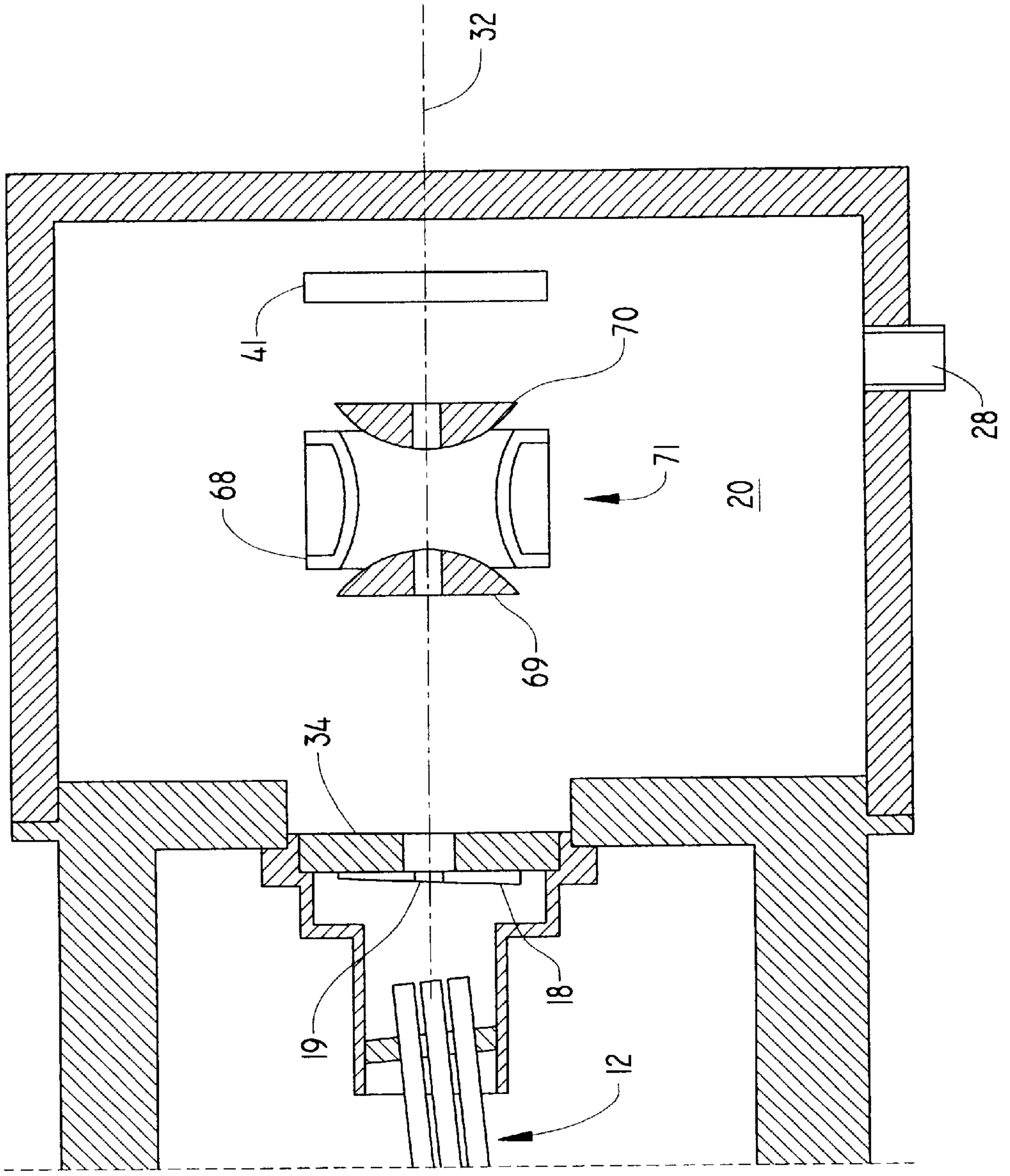
FIG. 6 is a sectional view of the mass analyser and detection regions of a spectrometer according to the invention having a quadrupole ion-trap mass analyser.

An embodiment of the invention using a quadrupole ion-trap mass analyzer generally indicated by 71 is shown in FIG. 6. As in the previous embodiments, the detailed construction and operation of the analyzer 71, which comprises a ring electrode 68 and two end-cap electrodes 69 and 70, is conventional and need not be described in detail. The analyzer 71 is merely disposed to receive ions passing through the aperture 19 in a similar manner to the quadrupole analyzer 29 shown in FIG. 3. The potential at the centre of the trap is maintained at ±1 volt relative to the axial potential of the guiding means, exactly as in the case of the quadrupole analyzer.

Referring again to FIG. 1, the six rod electrodes exemplified at 13–15 are enclosed along the front portion of their length (about half the total length) by gas containment means comprising a tube 21 which contains the support insulators 73 and 74 for the rods themselves. An inert gas is introduced into the tube 21 via an inlet pipe 22 so that the pressure in the elongate space 17 in the centre of the rods is at least $10^{-3}$ torr. The inlet pipe 22 is disposed so that the gas enters the ion-guiding means about one-quarter of its length from the entrance. The support insulators 73 and 74 are disposed close to the ends 23 and 24, respectively, of the tube 21 and are of relatively gas-tight construction (save for a central aperture through which the ions pass) so that a pressure differential of at least a factor of 10 can be maintained between the elongate space 17 and the first evacuated region 11. It would, however, be possible but less effective to supply the inert gas directly to the chamber 11 around the ion guiding means 12, particularly in an arrangement in which there is no tube 21, provided the pressure in the space 17 is maintained at at least $10^{-3}$ torr. Preferably, helium is introduced into the tube 21, but other gases such as argon can also be used. Nitrogen is also effective and has the advantage of being cheap, but tends to cause a higher background spectrum. The exact pressure in the elongate space 17 required to bring about the advantages of the invention has not been measured, but in practice the flow of helium is gradually increased while observing the resultant mass spectrum until the intensity of the interfering peaks begins to decrease, and may be then further increased until no further reduction is obtained or the intensity of wanted atomic ions begins to decrease.

Typically, for a hexapole ion guide comprising 3 mm dia. rods and an internal radius of the elongate space 17 of 5 mm, the AC applied to the rods is at a frequency of 5 MHz at a voltage of between 100 and 400 volts. Because in practice it is found that the maximum transmission of the hexapole for ions of different mass-to-charge ratios occurs at different voltages, the AC voltage is conveniently scanned in synchronism with the mass-to-charge ratio scanning of the mass analyzer to ensure that maximum transmission through the hexapole of the ions actually being detected is achieved.

As explained, particularly in the case of a quadrupole or quadrupole ion-trap mass analyzer which operates with ions of low kinetic energy, a potential difference of about 1 volt is maintained between the potential of the central axis 16 of the ion-guiding means 12 and the axial or centre potential of the quadrupole mass analyzer. This potential difference provides a potential barrier which positive ions emerging from the ion guiding means 12 must surmount by virtue of their kinetic energy before they can pass through the aperture 19 and into the mass analyzer. During their passage through the ion guiding means the kinetic energy of the ions is changed substantially to the thermal energy of the inert gas molecules introduced into the ion guiding means, so that the typical energy spread of 1 to 20 eV of ions generated in the plasma is greatly reduced. However, it has been unexpectedly found that molecular ions and atomic ions emerge from the guiding means with different kinetic energies, so that careful adjustment of the potential difference can further reduce the number of polyatomic ions which reach the mass analyzer.

A voltage of between −600 and −1000 volts is applied to the electrode 10 by a suitable power supply (not shown) to provide a degree of focusing action. This helps to increase the ion transmission by reducing the loss of ions (especially of low mass-to-charge ratio) on the inside surface of the skimmer 5. (Ions having low mass-to-charge ratios will tend to be on the outside of the material expanding from the aperture of the skimmer for gas kinetic reasons). In practice, the transmission of these low mass ions can be increased by a factor of about 100 by adjustment of the potential on the electrode 10. However, it has also been unexpectedly found that the presence of the electrode 10 also reduces intensity of molecular ions such as $ArO^+$, so that the potential on the electrode 10 can be adjusted also to minimise the intensity of these interfering ions. Fortunately the minimum in the intensity of the $ArO^+$ ions typically occurs at the same voltage which maximises transmission of the low mass ions, perhaps indicating that the optimum potential is that which minimises the contact of the ions with the inside surface of the skimmer 5.

Samples may be introduced into the plasma by any of the means conventionally employed in ICP or MIP mass spectrometry. However, the inventors have observed that the most significant improvements, particularly in respect of the suppression of $Ar^+$ ions, are obtained when samples are introduced in the form of aqueous solutions through a conventional type of nebulizer. It appears, therefore, that the material introduced into the plasma may play an as yet undefined role in the imperfectly understood mechanism by which the advantages of the invention are produced.

What is claimed is:

1. A mass spectrometer comprising:

a plasma source for generating ions from a sample introduced into a plasma;

nozzle-skimmer interface means for transmitting at least some of said ions into a first evacuated chamber along a first axis;

diaphragm means including an aperture, said diaphragm means dividing said first evacuated chamber from a second evacuated chamber;

ion guiding means disposed in said first evacuated chamber for guiding ions from said nozzle-skimmer interface means to said aperture, said ion guiding means including a multipole rod-set, including a plurality of elongate electrode rods spaced apart a short distance from each other about a second axis to define an elongate space therebetween extending longitudinally through said rod set, and means for applying an AC voltage between the electrode rods such that ions entering said rod set travel in said elongate space through said rod set;

means for introducing into said ion guiding means an inert gas selected from the group consisting of helium, neon, argon, krypton, xenon and nitrogen so that the partial pressure of said inert gas in at least a portion of said elongate space inside said rod set(s) is at least $10^{-3}$ torr;

a gas containment sleeve surrounding at least a portion of said ion guiding means and being disposed within said first evacuated chamber and disposed so that at least one of an entrance and an exit of the ion guiding means is outside of said sleeve, wherein said inert gas is introduced into said sleeve so that the partial pressure of said inert gas is at least $10^{-3}$ torr in at least a portion of the ion guiding means while the at least one of the entrance and the exit of said ion guiding means is maintained at a lower pressure; and ion mass-to-charge ratio analyzing means having an entrance axis and disposed to receive ions passing through said aperture and to produce a mass spectrum thereof.

2. A mass spectrometer as claimed in claim 1 wherein helium is introduced into said ion guiding means.

3. A mass spectrometer as claimed in claim 1 wherein means are provided for introducing said inert gas into said gas containment means in such a way that the highest partial pressure of said inert gas in said elongate space occurs at a point not more than approximately half the length of said ion guiding means from the entrance of said ion guiding means.

4. A mass spectrometer as claimed in claim 3 wherein said inert gas is introduced in such a way that the highest partial pressure of said inert gas in said elongate space occurs at a point approximately one quarter of the length of said ion guiding means from the entrance of said ion guiding means.

5. A mass spectrometer as claimed in claim 1 wherein said ion guiding means comprises a hexapole rod set.

6. A mass spectrometer as claimed in claim 1 wherein said ion guiding means comprises a quadrupole rod set.

7. A mass spectrometer as claimed in claim 1 wherein the length of said ion guiding means is between 20 and 100 times greater than the radius of said elongate space.

8. A mass spectrometer as claimed in claim 1 wherein said first axis does not pass through said aperture and wherein said second axis is inclined to said first axis so that ions leaving the nozzle-skimmer interface means enter the elongate space in the guiding means and are guided by the ion confining action of the guiding means to the aperture.

9. A mass spectrometer as claimed in claim 8 wherein said entrance axis is inclined relative to said second axis.

10. A mass spectrometer as claimed in claim 9 wherein said ion guiding means comprises a hexapole rod set.

11. A mass spectrometer as claimed in claim 1 wherein said ion mass-to-charge analyzing means comprises a magnetic sector mass analyzer.

12. A mass spectrometer as claimed in claim 11 wherein said magnetic sector mass analyzer comprises a plurality of ion collectors disposed along its image focal plane so that ions of several different mass-to-charge ratios can be measured simultaneously.

13. A mass spectrometer as claimed in claim 11 wherein said magnetic sector analyzer comprises an entrance aperture, flight tube and detector system and wherein said nozzle-skimmer interface and ion-guiding means are maintained at approximately ground potential and said entrance aperture, flight-tube and detector system are maintained at an accelerating potential such that the ions entering the analyser are accelerated to the kinetic energy necessary for their dispersion by said magnetic sector as they pass through said entrance aperture.

14. A mass spectrometer as claimed in claim 13 wherein said ion guiding means comprises a hexapole rod set.

15. A mass spectrometer as claimed in claim 1 wherein said ion mass-to-charge ratio analyzer comprises a quadrupole mass analyzer.

16. A mass spectrometer a claimed in claim 15 wherein said ion guiding means comprises a hexapole rod set.

17. A mass spectrometer as claimed in claim 1 wherein said ion mass-to-charge ratio analyzer comprises a time-of-flight analyzer.

18. A mass spectrometer as claimed in claim 17 wherein said ion guiding means comprises a hexapole rod set.

19. A mass spectrometer as claimed in claim 17 wherein said time-of-flight mass analyzer has an orthogonal disposition of its entrance axis and the axis about which ions travel while their time-of-flight is being determined.

20. A mass spectrometer as claimed in claim 1 wherein said ion mass-to-charge analyzer comprises a quadrupole ion-trap analyzer.

21. A mass spectrometer as claimed in claim 20 wherein said ion guiding means comprises a hexapole rod set.

22. A mass spectrometer as claimed in claim 1 wherein electrostatic lens means are provided between said nozzle-skimmer interface and the entrance of the ion-guiding means, said electrostatic lens means comprising a hollow conical structure disposed with its apex closest to the skimmer and maintained at a potential of between 600 and 1000 volts relative to the potential of the nozzle-skimmer interface and the ion guiding means.

23. A mass spectrometer as claimed in claim 22 wherein said ion guiding means comprises a hexapole rod set.

24. A mass spectrometer as claimed in claim 1 wherein said diaphragm means further comprises: a focusing electrode which is tapered.

* * * * *